(12) United States Patent
Sawai et al.

(10) Patent No.: US 11,014,420 B2
(45) Date of Patent: May 25, 2021

(54) VEHICLE

(71) Applicant: Yamaha Hatsudoki Kabushiki Kaisha, Shizuoka-ken (JP)

(72) Inventors: Seiji Sawai, Shizuoka (JP); Masahiro Yoshida, Shizuoka (JP); Kenta Higashiyama, Shizuoka (JP); Masahide Shimbori, Shizuoka (JP)

(73) Assignee: YAMAHA HATSUDOKI KABUSHIKI KAISHA, Shizuoka-Ken (JP)

( * ) Notice: Subject to any disclaimer, the term of this patent is extended or adjusted under 35 U.S.C. 154(b) by 147 days.

(21) Appl. No.: 16/357,329

(22) Filed: Mar. 19, 2019

(65) Prior Publication Data
US 2019/0291521 A1 Sep. 26, 2019

(30) Foreign Application Priority Data

Mar. 22, 2018 (JP) .............................. JP2018-053930

(51) Int. Cl.
| | |
|---|---|
| *B60G 3/20* | (2006.01) |
| *B60G 7/00* | (2006.01) |
| *B60K 17/16* | (2006.01) |
| *B60G 21/055* | (2006.01) |
| *B60G 21/02* | (2006.01) |

(52) U.S. Cl.
CPC ............. *B60G 3/202* (2013.01); *B60G 7/001* (2013.01); *B60G 7/005* (2013.01); *B60G 21/026* (2013.01); *B60G 21/055* (2013.01); *B60K 17/165* (2013.01); *B60G 2200/1442* (2013.01); *B60G 2204/143* (2013.01); *B60G 2204/8302* (2013.01)

(58) Field of Classification Search
CPC ........ B60G 3/202; B60G 7/001; B60G 7/005; B60G 21/055; B60G 21/026; B60G 2204/8302; B60G 2200/1442; B60G 2204/143; B60G 2200/462; B60G 2300/07; B60G 2300/13; B60K 17/165; B60K 2005/003; B60Y 2200/124
See application file for complete search history.

(56) References Cited

U.S. PATENT DOCUMENTS

| | | | | |
|---|---|---|---|---|
| 5,340,146 A | * | 8/1994 | Kato ..................... | B60G 3/202 |
| | | | | 280/124.135 |
| 7,891,684 B1 | * | 2/2011 | Luttinen ................. | B60G 3/20 |
| | | | | 280/124.136 |
| 2007/0007742 A1 | * | 1/2007 | Allen ..................... | B60G 3/18 |
| | | | | 280/124.134 |

(Continued)

*Primary Examiner* — Darlene P Condra
(74) *Attorney, Agent, or Firm* — HEA Law PLLC

(57) ABSTRACT

A vehicle that can reduce change in the toe angle of a rear wheel in a toe-out direction at the time of a braking force being provided by the vehicle. A coupling point between a vehicle frame and a trailing arm is defined as a first coupling point. A coupling point between the trailing arm and a lateral arm is defined as a second coupling point. A coupling point between the lateral arm and a frame rear section is defined as a third coupling point. A straight line connecting the first coupling point and the second coupling point is defined as a first straight line. A straight line connecting the second coupling point and the third coupling point is defined as a second straight line. With those definitions, an angle between the first straight line and the second straight line in a plan view of the vehicle is 90 degrees or greater.

17 Claims, 12 Drawing Sheets

(56) References Cited

U.S. PATENT DOCUMENTS

| | | | |
|---|---|---|---|
| 2011/0035113 A1* | 2/2011 | Yanagi | B60G 7/006 |
| | | | 701/42 |
| 2012/0031688 A1 | 2/2012 | Safranski et al. | |
| 2013/0277937 A1 | 10/2013 | Keller et al. | |
| 2014/0353937 A1* | 12/2014 | Girelli Consolaro | B60G 11/22 |
| | | | 280/124.128 |
| 2016/0347137 A1 | 12/2016 | Despres-Nadeau et al. | |
| 2017/0050484 A1* | 2/2017 | Coppuck | B60G 3/202 |
| 2018/0079269 A1* | 3/2018 | Yanagida | B60G 3/20 |
| 2019/0023093 A1* | 1/2019 | Gerhards | B60K 1/04 |
| 2019/0193501 A1* | 6/2019 | Brady | B60G 21/055 |

* cited by examiner

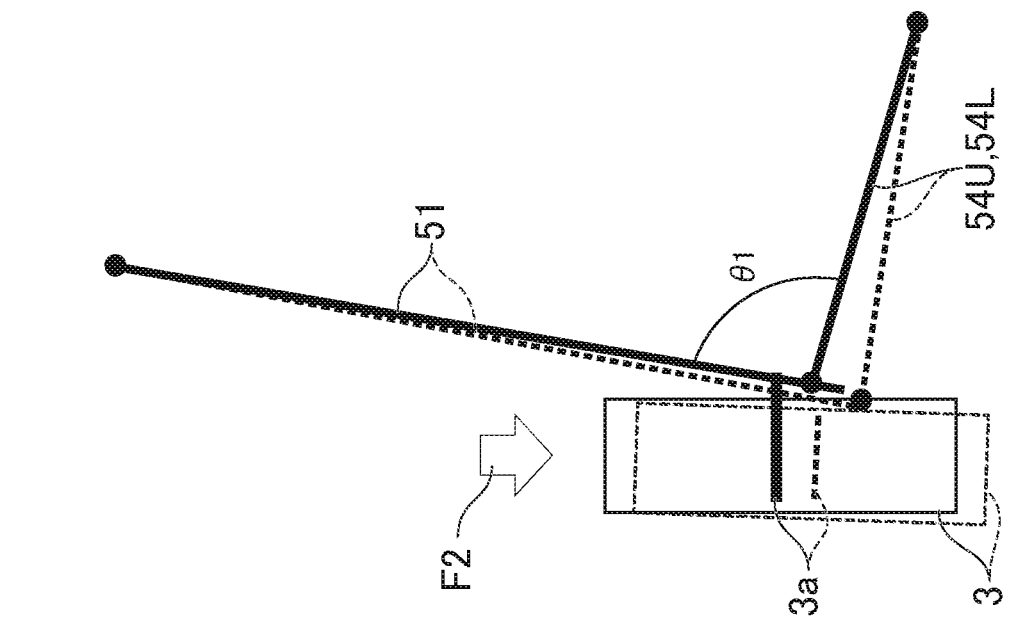
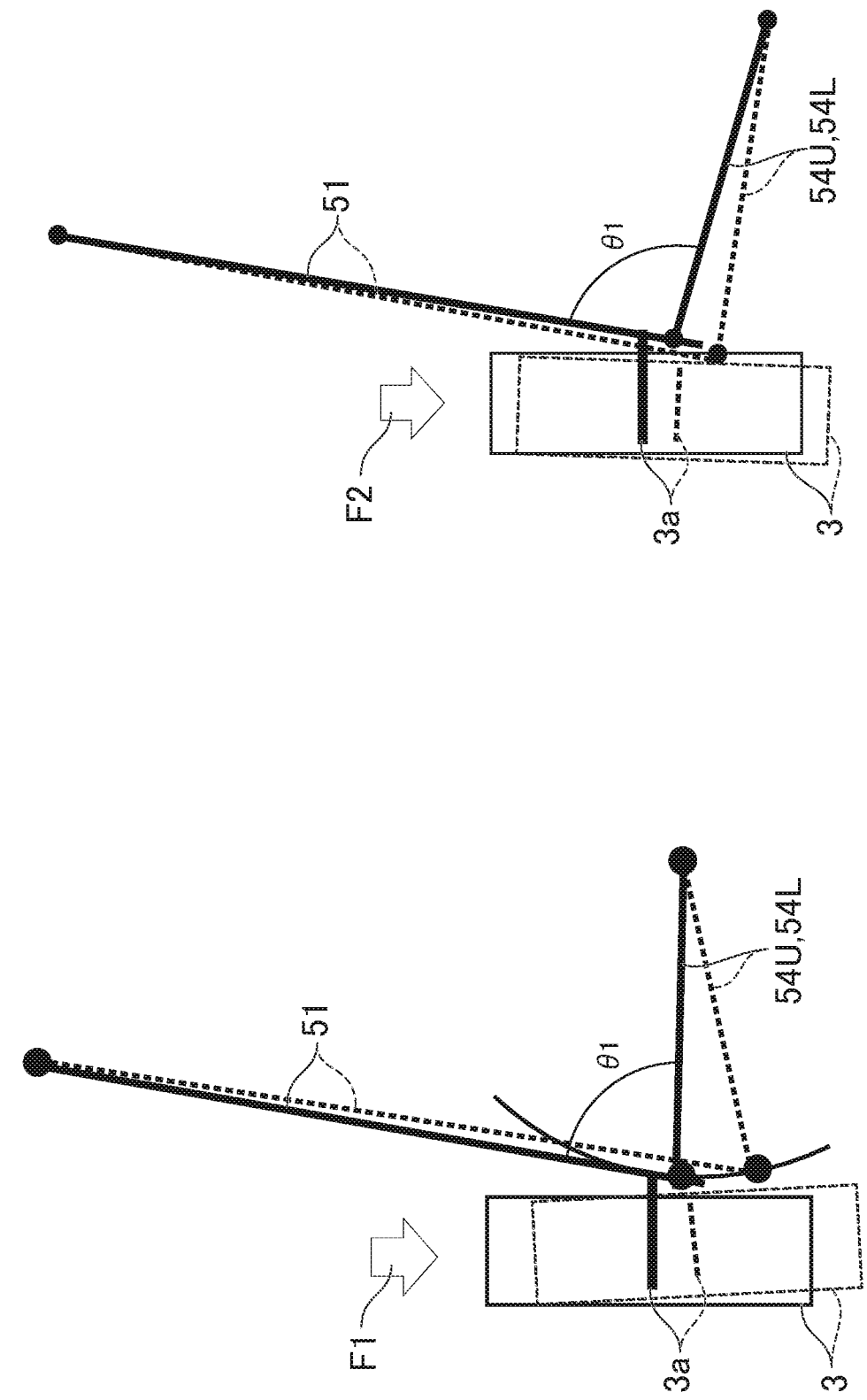

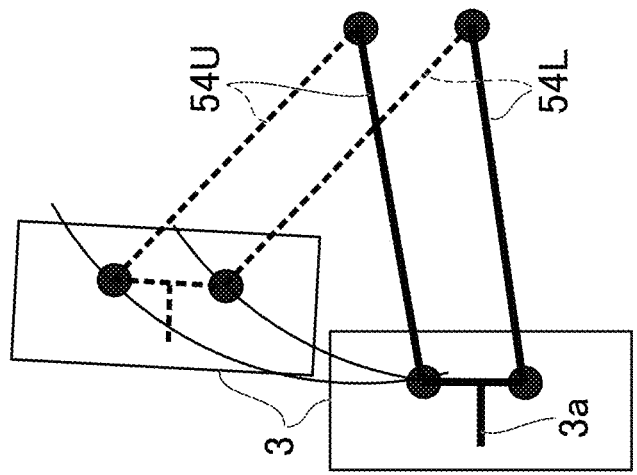
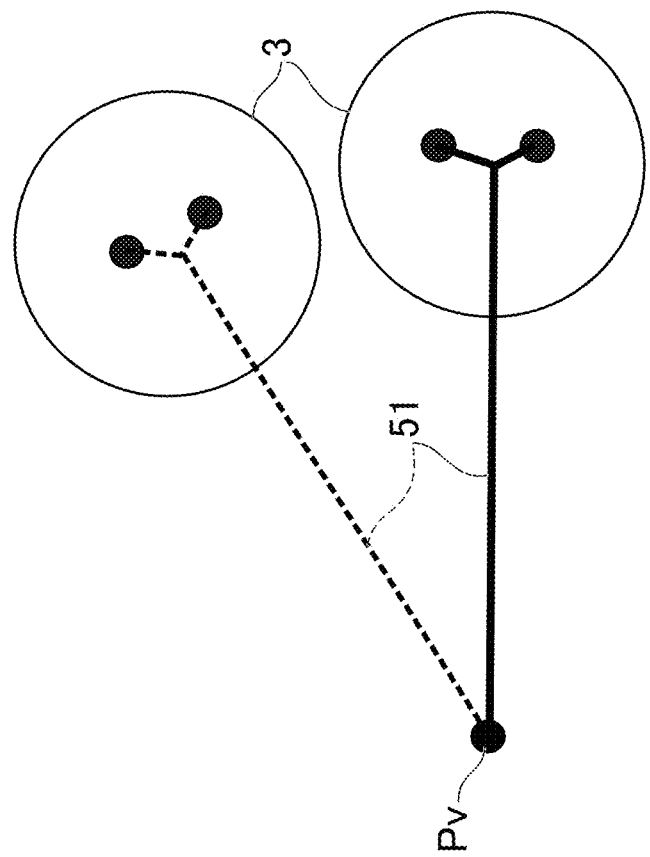
FIG.11A
FIG.11B

VEHICLE

CROSS-REFERENCE TO RELATED APPLICATION

The present application claims priority from Japanese application JP2018-053930 filed on Mar. 22, 2018, the content of which is hereby incorporated by reference, in its entirety, into this application.

Field of the Invention

The present invention relates to a rear suspension structure of a vehicle.

BACKGROUND OF THE INVENTION

Description of the Related Art

Some vehicles employ a trailing arm rear suspension. A trailing arm is coupled to a vehicle frame via a support shaft and can move up and down about the support shaft. In a suspension of this type, the rear wheel is coupled to the trailing arm via a ball joint and therefore the angle of the rear wheel to the trailing arm (angle when the vehicle is viewed in a plan view) can change, as described in published applications US2013/277937A1 and US2016/347137A1. Meanwhile, unlike the suspensions of US2013/277937A1 and US2016/347137A1, there is a suspension in which the angle of the rear wheel to the trailing arm is fixed because the rear wheel is fastened to the trailing arm with a bolt (for example, published application US2012/031688A1). In the vehicle of US2012/031688A1, two parallel arms (here referred to as lateral arms) extending in the left-right direction are arranged, bridging the space between the rear end of the trailing arm and the vehicle frame.

In the structure described in US2012/031688A1, that is, in the structure where the angle of the rear wheel is fixed to the trailing arm, if the angle of the trailing arm in a plan view of the vehicle changes, the toe angle of the rear wheel also changes (the toe angle refers to an angle of the rear wheel with respect to the front-rear direction in a plan view of the vehicle). It is desirable that the toe angle of the rear wheel changes in a toe-in direction. That is, it is desirable that the direction of the rear wheel changes toward the center in the direction of vehicle width. However, in the structure of US2012/031688A1, for example, when a braking force acts on the rear wheel, the toe angle of the rear wheel tends to change in a toe-out direction (outward in the direction of vehicle width).

SUMMARY OF THE INVENTION

An object of this disclosure is to provide a vehicle that can reduce change in the toe angle of the rear wheel in a toe-out direction at the time of braking by the vehicle.

(1) According to an aspect of this disclosure, a vehicle includes: a vehicle frame; a trailing arm which has a supported part coupled to the vehicle frame and extends rearward from the supported part; a rear wheel attached to the trailing arm; and a lateral arm which couples the vehicle frame and the trailing arm at a position away in a rearward direction from the supported part. The rear wheel is attached to the trailing arm such that an angle between the rear wheel and the trailing angle in a plan view of the vehicle is fixed. A coupling point between the vehicle frame and the trailing arm is defined as a first coupling point, a coupling point between the trailing arm and the lateral arm is defined as a second coupling point, a coupling point between the lateral arm and the vehicle frame is defined as a third coupling point, a straight line connecting the first coupling point and the second coupling point is defined as a first straight line, and a straight line connecting the second coupling point and the third coupling point is defined as a second straight line. When those definitions are made, an angle between the first straight line and the second straight line in a plan view of the vehicle is 90 degrees or greater. This configuration can reduce change in the toe angle of the rear wheel in a toe-out direction, for example, at the time of braking by the vehicle.

(2) In the vehicle of (1), the third coupling point may be located farther rearward than a gear box accommodating a final reduction gear mechanism which transmits power of an engine to the rear wheel. This configuration allows the third coupling point to be located near a rearmost part of the vehicle body or at the rearmost part. Therefore, an angle of 90 degrees or greater can be easily secured between the first straight line and the second straight line. The final reduction gear mechanism is, for example, a reduction gear mechanism which rotates left and right drive shafts at the same speed, or a differential gear which allows a difference in rotational speed between left and right drive shafts.

(3) In the vehicle of (2), the vehicle frame may have a part which is located farther rearward than the gear box and which does not overlap the gear box as viewed in a plan view. The lateral arm may be coupled to the part of the vehicle frame. This configuration allows the third coupling point to be located near the rearmost part of the vehicle body or located in the rearmost part. Therefore, an angle of 90 degrees or greater can be easily secured between the first straight line and the second straight line.

(4) In the vehicle of (1), the vehicle frame may include a frame rear section located between left and right rear wheels. The third coupling point may be located at a rear end of the frame rear section. Owing to this configuration, an angle of 90 degrees or greater can be easily secured between the first straight line and the second straight line.

(5) In the vehicle of (1), the lateral arm may be coupled to the vehicle frame via a ball joint at the third coupling point. This configuration enables the lateral arm to have a sufficient length. Thus, when the rear wheel goes over a bump on the ground, the swing angle of the lateral arm is reduced and therefore change in the toe angle of the rear wheel in a toe-out direction can be reduced.

(6) In the vehicle of (5), the ball joint may have a rod. One end of the rod may be supported by the vehicle frame. A coupling member may be attached to the other end of the rod to connect the rod to another part. This configuration can enhance the support structure of the rod.

(7) In the vehicle of (1), two trailing arms are each used as the trailing arm and located opposite to each other in a left-right direction. The two trailing arms may be coupled by a stabilizer. Each of the two trailing arms may be coupled to the vehicle frame via a shock absorber. The trailing arm may be coupled to the vehicle frame via a toe-control link. When a straight line connecting the first coupling point and the third coupling point is defined as a third straight line, a coupling part between the toe-control link and the trailing arm, a coupling part between the stabilizer and the trailing arm, and a coupling part between the trailing arm and the shock absorber may be located inside a triangle defined by the first straight line, the second straight line, and the third straight line. Owing to this configuration, the positions of the three coupling points are not widely dispersed. Therefore, a space to arrange other components is easily secured.

(8) The vehicle of (1) may further include a toe-control link which is arranged between the supported part and the lateral arm and which couples the trailing arm and the vehicle frame. This configuration can reduce change in the toe angle of the rear wheel in a toe-out direction when the rear wheel goes over a bump on the ground.

(9) In the vehicle of (2), the supported part of the trailing arm may be displaceable in a direction of vehicle width with respect to the vehicle frame. This configuration allows the supported part of the trailing arm to be displaced toward the center in the direction of vehicle width due to the action of the control link, when the rear wheel goes over a bump on the ground. Thus, change in the toe angle of the rear wheel in a toe-out direction can be reduced more effectively.

(10) In the vehicle of (8), the toe-control link may extend rearward and outward in a direction of vehicle width from a coupling point between the toe-control link and the vehicle frame. Owing to this configuration, the angle of the straight line connecting the first coupling point and the third coupling point, to the direction of extension of the toe-control link, is close to 90 degrees. Therefore, displacement of the trailing arm is reduced when a force in the lateral direction acts on the rear wheel. Thus, change in the toe angle of the rear wheel can be reduced.

(11) The vehicle of (9) may have, as the trailing arm, two trailing arms located opposite to each other in a left-right direction. The two trailing arms may be coupled via a stabilizer. A coupling part between a toe-control link and the trailing arm may be located farther forward than a coupling part between the stabilizer and the trailing arm. Owing to this configuration, the position of the toe-control link is close to the front end of the trailing arm and this reduces the length of the toe-control link. Thus, when the rear wheel goes over a bump on the ground, change in the toe angle of the rear wheel in a toe-out direction can be reduced more effectively.

(12) The vehicle of (2) may have a shock absorber coupled between the vehicle frame and the trailing arm. A coupling part between a toe-control link and the trailing arm may be located farther forward than a coupling part between the trailing arm and the shock absorber. Owing to this configuration, the position of the toe-control link is close to the front end of the trailing arm and this reduces the length of the toe-control link. Thus, when the rear wheel goes over a bump on the ground, change in the toe angle of the rear wheel in a toe-out direction can be reduced more effectively.

(13) In the vehicle of (1), the first straight line may intersect a tire of the rear wheel, in a plan view of the vehicle. Owing to this configuration, the front end (supported part) of the trailing arm is located farther forward than, for example, in the configuration where the first straight line does not intersect the tire of the rear wheel. This can increase the length of the trailing arm, reduce the swing angle of the trailing arm, and therefore can reduce change in the toe angle of the rear wheel in a toe-out direction more effectively.

(14) The vehicle of (1) may further include a gear box accommodating a final reduction gear mechanism which transmits power of an engine to the rear wheel. When a straight line connecting the first coupling point and the third coupling point is defined as a third straight line, the third straight line may intersect the gear box in a plan view of the vehicle. The front end (supported part) of the trailing arm in this configuration is located farther forward than, for example, in the configuration where the third straight line does not intersect the gear box. This can increase the length of the trailing arm, reduce the swing angle of the trailing arm, and therefore can reduce change in the toe angle of the rear wheel in a toe-out direction more effectively.

(15) In the vehicle of (1), when a force pushing the rear wheel rearward acts, the trailing arm may tilt outward in a direction of vehicle width from an initial position, and a toe angle of the rear wheel may change in a toe-in direction.

BRIEF DESCRIPTION OF THE DRAWINGS

The present invention is illustrated by way of example and not limited in the figures of the accompanying drawings in which like references indicate similar elements.

FIGS. 10A and 10B are plan views showing the behavior of the rear suspension at the time of braking on the vehicle. FIG. 10A shows the behavior of the rear suspension of the related-art vehicle. FIG. 10B shows the behavior of the rear suspension of the vehicle proposed in this disclosure.

FIGS. 11A and 11B explain the behavior of the rear suspension when the rear wheel goes over a bump on the ground. FIG. 11A is a side view. FIG. 11B is a back view.

FIG. 12A shows the behavior of the rear suspension of the related-art vehicle. FIG. 12B shows the behavior of the rear suspension of the vehicle proposed in this disclosure.

DETAILED DESCRIPTION OF THE INVENTION

Figure 1:
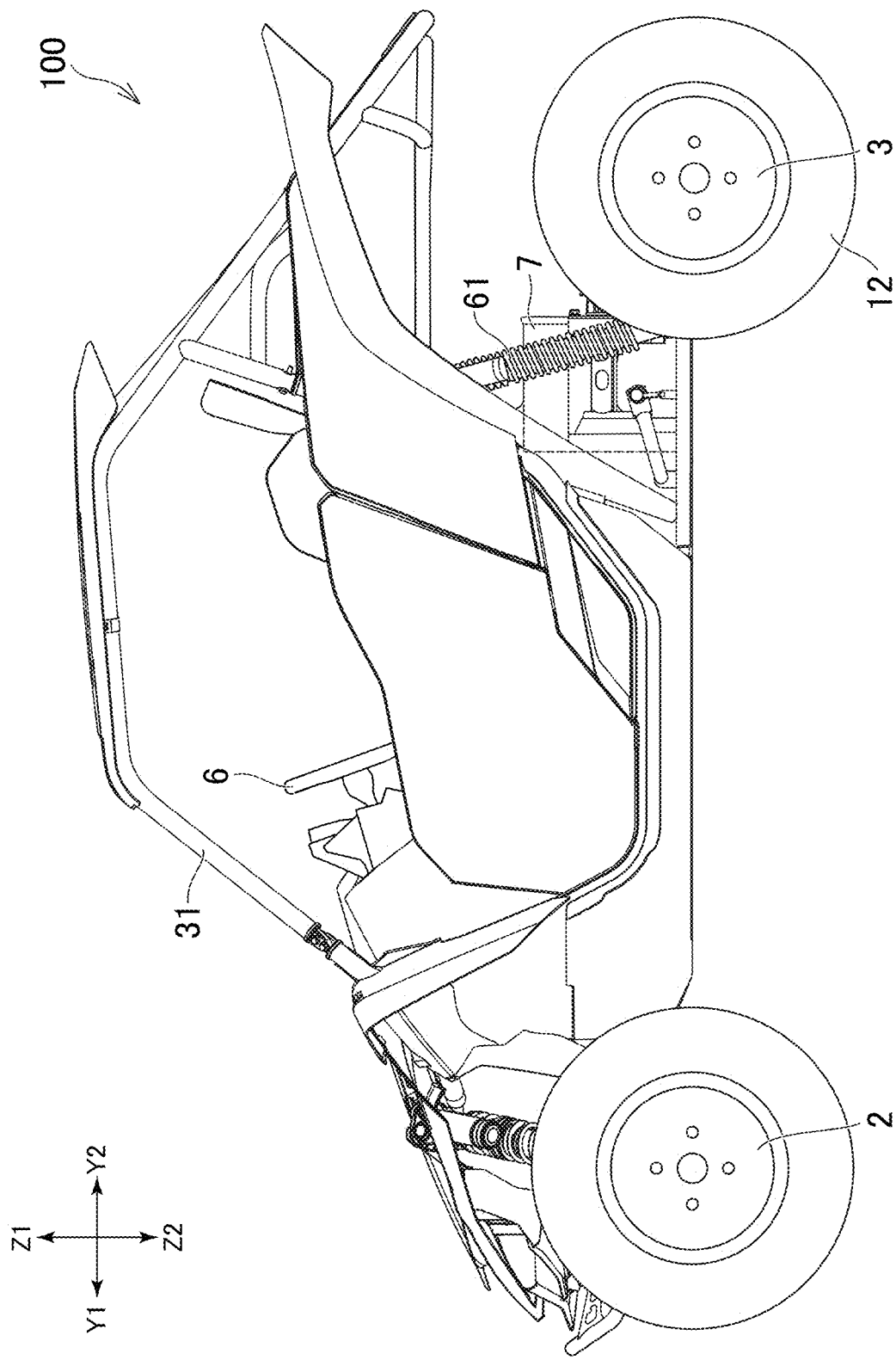
FIG. 1 is a side view showing an example of a vehicle proposed in this disclosure.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises", "comprising", "includes", and/or "including", when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of technologies are disclosed. Each of these has individual benefit and each can also be used in conjunction with one or more, or in some cases all, of the other disclosed technologies. Accordingly, for the sake of clarity, this description will refrain from repeating every possible combination of the individual technologies in an unnecessary fashion. Nevertheless, the specification and claims should be read with the understanding that such combinations are entirely within the scope of the invention and the claims. All identically numbered reference characters correspond to each other so that a duplicative description of each reference character in the drawings may be omitted.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Hereinafter, an example of a vehicle proposed in this disclosure will be described. In FIGS. 1 to 9, directions indicated by Y1 and Y2 are referred to as forward and rearward respectively. Directions indicated by Z1 and Z2 are referred to as above and below respectively. Direction indicated by X1 and X2 are referred to as to right and left respectively. A direction X1-X2 is referred to as a direction of vehicle width.

In this specification, a vehicle 100 shown in FIG. 1 and other drawings is described as an example of the vehicle. The vehicle 100 is a vehicle called an all-terrain vehicle (ATV), side-by-side vehicle, utility vehicle, recreational off-highway vehicle or the like, which is used relatively frequently on uneven ground.

[Overall Outline]

The vehicle 100 has left and right front wheels (or wheel) 2 and left and right rear wheels (or wheel) 3. The vehicle 100 also has left and right seats 4 (see FIG. 2). One of the seats 4, which is the left seat 4 in the exampled vehicle 100, is a driver seat where a driver sits. A steering wheel 6 (see FIG. 1) is arranged in front of the driver seat 4. The number of the seats 4 is not limited to two and may be, for example, four. That is, the vehicle 100 may have rear seats arranged to the rear of the seats 4. Also, the number of the seats 4 may be one. That is, the vehicle 100 may have a seat arranged at the center in the direction of vehicle width (left-right direction). In this case, the seat may be a type which the driver sits astride.

Figure 2:
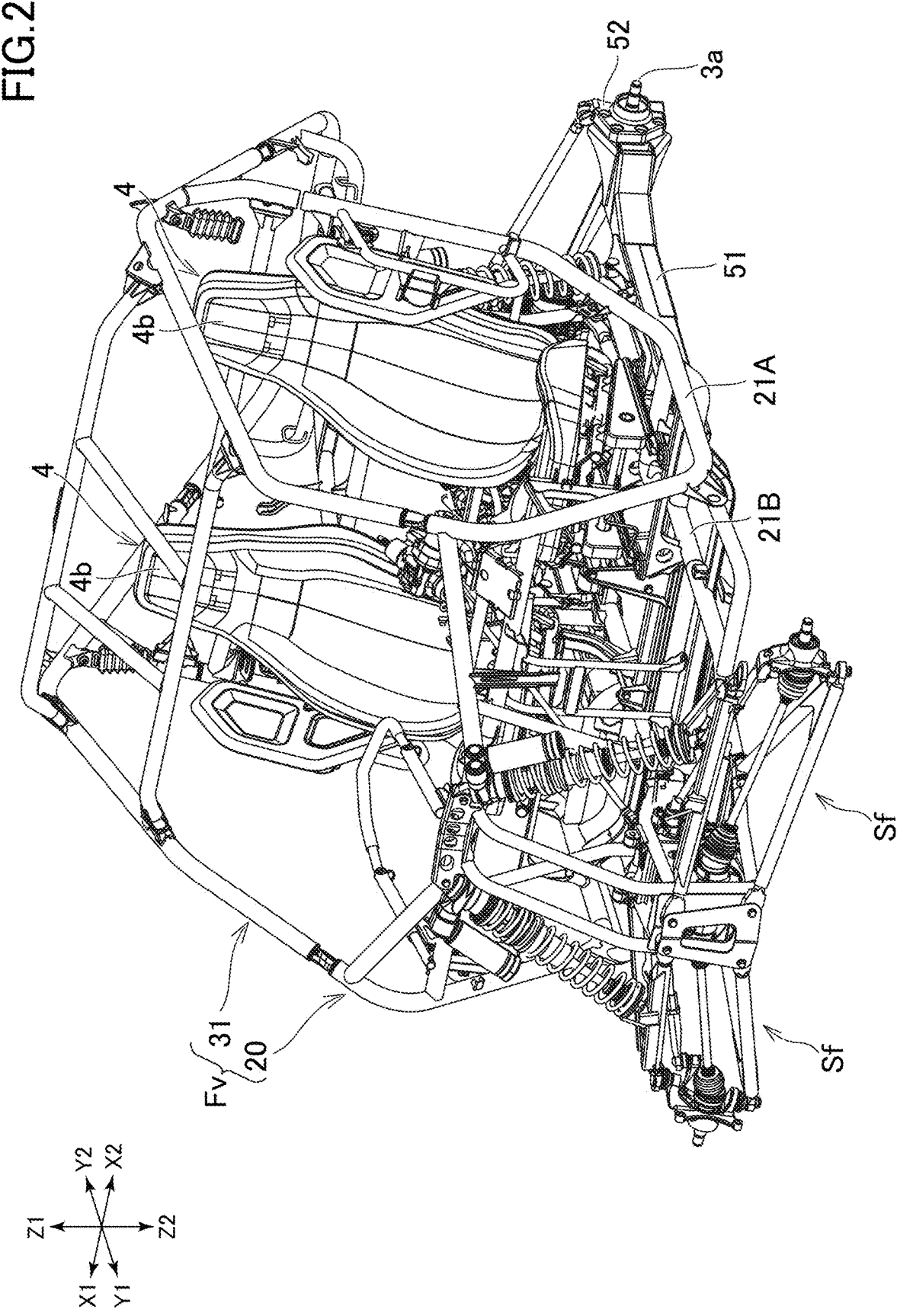
FIG. 2 is a perspective view of a vehicle frame of the vehicle.

As shown in FIG. 2, the vehicle 100 has a vehicle frame Fv. The vehicle frame Fv has a body frame 20 which supports the seat 4, an engine 7 (see FIG. 3) and a transmission (not illustrated) or the like. In the exampled vehicle 100, the vehicle frame Fv has a cage 31 covering the seat 4. The body frame 20 and the cage 31 are made up of a plurality of pipes and coupled in the up-down direction. The vehicle frame Fv may not necessarily have to have the cage 31.

Figure 3:
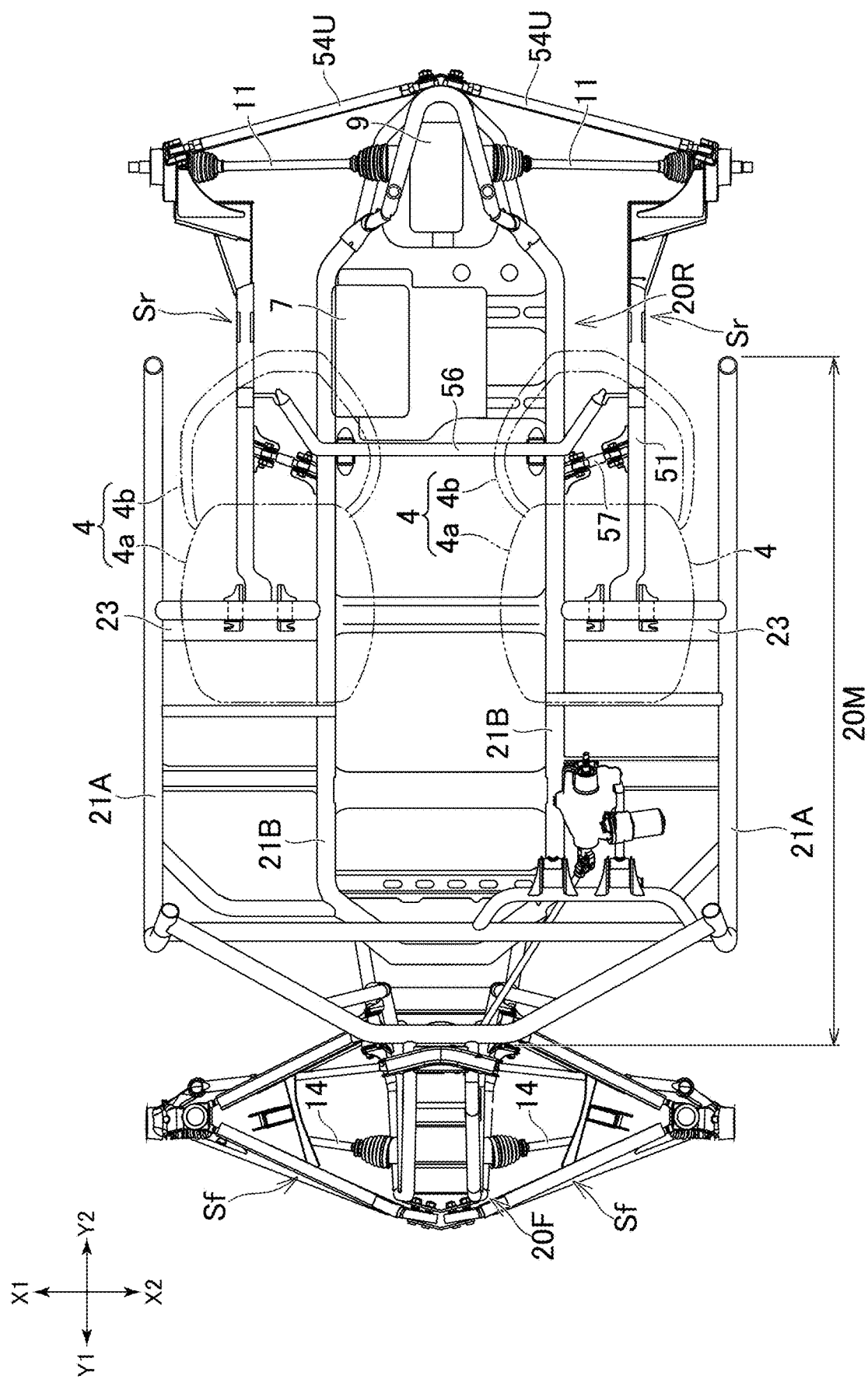
FIG. 3 is a plan view of a lower part of the vehicle frame and a rear suspension.

As shown in FIG. 3, the body frame 20 has a frame middle section 20M and a frame front section 20F. A bottom part of the frame middle section 20M is disposed on the lower side of the seat 4 and supports the seat 4. A front suspension Sf and the front wheel 2 are located to the left and right of the frame front section 20F. The frame front section 20F supports the front wheel 2 via the front suspension Sf and enables the front wheel 2 to move up and down with respect to the vehicle frame Fv.

As shown in FIG. 3, the body frame 20 also has a frame rear section 20R. The frame rear section 20R is a part having a smaller width than the width in the left-right direction of the frame middle section 20M and extending rearward from a center part of the frame middle section 20M. A rear suspension Sr and the rear wheel 3 are arranged to the left and right of the frame rear section 20R. The frame rear section 20R supports the rear wheel 3 via the rear suspension Sr and enables the rear wheel 3 to move up and down with respect to the vehicle frame Fv. The engine 7 is disposed farther rearward than the seat 4 and supported on the upper side of the frame rear section 20R. A gear box 9 is located to the rear of the engine 7. The gear box 9, too, is supported on the upper side of the frame rear section 20R.

The power of the engine 7 is transmitted to the rear wheel 3 via a propeller shaft (not illustrated) extending rearward from the transmission connected to the engine 7, the gear box 9 arranged to the rear of the engine 7, having the propeller shaft connected thereto and accommodating a final reduction gear mechanism, and a drive shaft 11 extending to the right and to the left from the gear box 9. The final reduction gear mechanism accommodated in the gear box 9 may be a mechanism which rotates the left and right drive shafts 11 at the same speed, or a differential gear which allows the difference between the rotational speeds of the left and right drive shafts 11. The vehicle 100 is a four-wheel drive vehicle, and the power of the engine 7 is also transmitted to the front wheel 2. That is, the power from the engine 7 is transmitted to the front wheel 2 via a propeller shaft (not illustrated) extending forward from the transmission, a front differential gear (not illustrated) connected to the propeller shaft, and a drive shaft 14 extending to the left and to the right from the front differential gear. Also, the vehicle 100 may not have to be a four-wheel drive vehicle.

[Rear Suspension]

[Trailing Arm]

The rear suspension Sr is a trailing-arm type and has a trailing arm 51, as shown in FIG. 3. The trailing arm 51 extends rearward from the frame middle section 20M. Specifically, the frame middle section 20M has a side extension part 21A located in a right part and a left part of the frame middle section 20M and extending in the front-rear direction, and two middle extension parts 21B arranged between the left and right side extension parts 21A and extending in the front-rear direction. The frame rear section 20R extends rearward from the middle extension part 21B. A bottom part of the frame middle section 20M has a plurality of cross members arranged between the side extension part 21A and the middle extension part 21B. The front end of the trailing arm 51 is connected to a cross member 23 located at the rearmost part, of the plurality of cross members.

Figure 5:
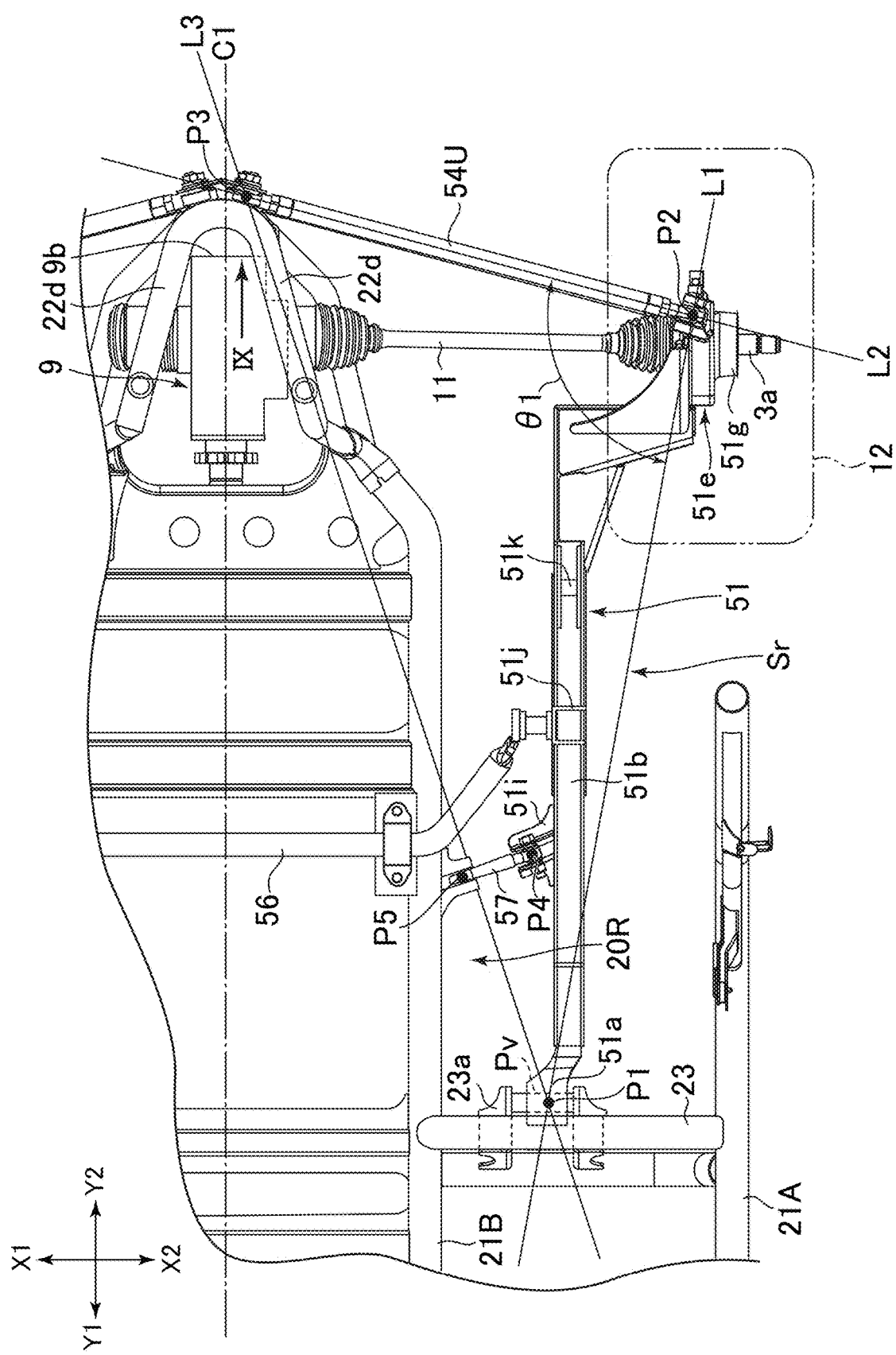
FIG. 5 is a plan view showing essential parts of the rear suspension.

As shown in FIG. 5, the front end of the trailing arm 51 is connected to the frame middle section 20M (more specifically, the cross member 23) such that the trailing arm 51 can swing up and down. The front end of the trailing arm 51 is connected to the frame middle section 20M, for example, via a support shaft Pv. Specifically, an arm support part 23a (bracket) is fixed to the cross member 23 of the frame middle section 20M, and supports the support shaft Pv. In the exampled vehicle 100, the arm support part 23a is fixed to the lower side of the cross member 23 and supports both ends of the support shaft Pv. The trailing arm 51 has, at its front end, a tubular supported part 51a which is coupled to the support shaft Pv (in which the support shaft Pv is inserted). The trailing arm 51 can swing up and down about the support shaft Pv. A bush (elastic member, for example, rubber bush) is arranged between the support shaft Pv and the supported part 51a. The front end of the trailing arm 51 may be connected to the frame middle section 20M via a ball joint instead of the support shaft and the bush.

As shown in FIG. 5, a rear part of the side extension part 21A of the frame middle section 20M extends farther rearward than the cross member 23, to which the front end of the trailing arm 51 is coupled. Also, a rear part of the middle extension part 21B of the frame middle section 20M extends farther rearward than the cross member 23 and thus forms the frame rear section 20R. The trailing arm 51 is arranged between the rear part of the side extension part 21A and the rear part of the middle extension part 21B (frame rear section 20R). A front part of the trailing arm 51 extends farther forward than the rear end of the side extension part 21A. Thus, the trailing arm 51 secures a sufficient length. In the examined vehicle 100, the front end (supported part 51a) of the trailing arm 51 is located below the seat 4 (more specifically, a seat bottom 4a). A cross member is arranged, bridging the space between the rear parts of the left and right middle extension parts 21B forming the frame rear section 20R. The engine 7 (FIG. 3) is arranged on the upper side of this cross member.

[Fixing Structure Between Trailing Arm and Rear Wheel]

The rear wheel 3 is attached to the trailing arm 51. The rear wheel 3 is attached to the trailing arm 51 such that the relative position between the rear wheel 3 and the trailing arm 51 does not change. Therefore, the angle between the rear wheel 3 and the trailing arm 51, that is, the angle between an axle 3a of the rear wheel 3 (see FIG. 5) and the trailing arm 51 in a plan view, is fixed.

Figure 7:
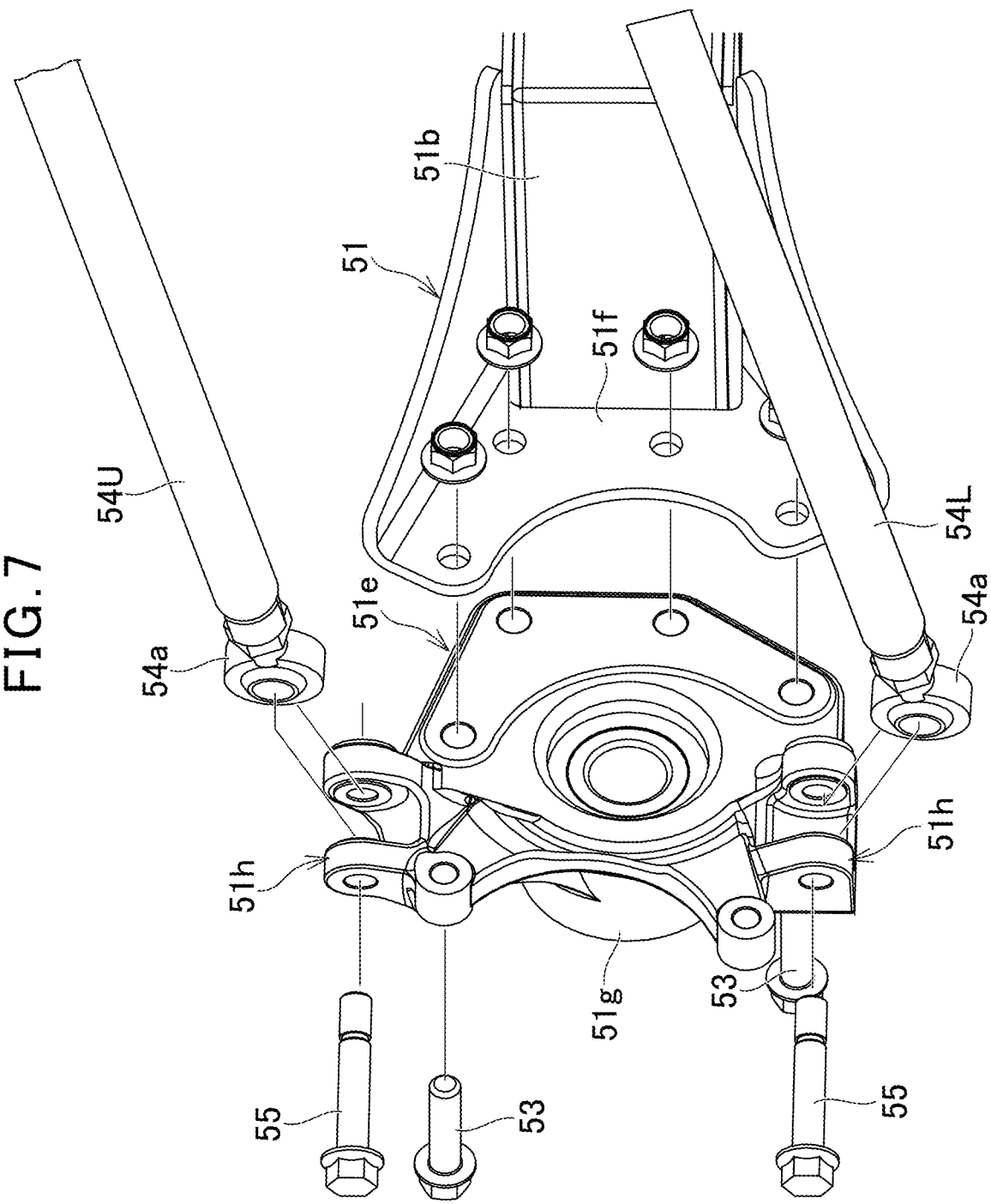
FIG. 7 is an exploded perspective view showing a coupling structure between a trailing arm and a knuckle.

Specifically, as shown in FIG. 7, the trailing arm 51 has an arm body 51b extending rearward from the front end of the trailing arm 51, and a knuckle part 51e attached to the arm body 51b. The knuckle part 51e is located outward in the direction of vehicle width from a wall part 51f formed at the rear end of the arm body 51b and is attached to the wall part 51f with a plurality of fasteners 53 (e.g. bolts). Therefore, the relative position between the arm body 51b and the knuckle part 51e is fixed. The axle 3a is held to be rotatable inside of a tubular part 51g provided in the knuckle part 51e. The rear wheel 3 is attached to the axle 3a via a hub (not illustrated). Therefore, in addition to the relative position between the arm body 51b and the knuckle part 51e, the relative position (angle) between the knuckle part 51e and the axle 3a is fixed. Thus, the angle between the rear wheel 3 and the trailing arm 51 is fixed. The fixing structure between the rear wheel 3 and the trailing arm 51 is not limited to the structure in the examined vehicle 100.

[Lateral Arm]

Figure 4:
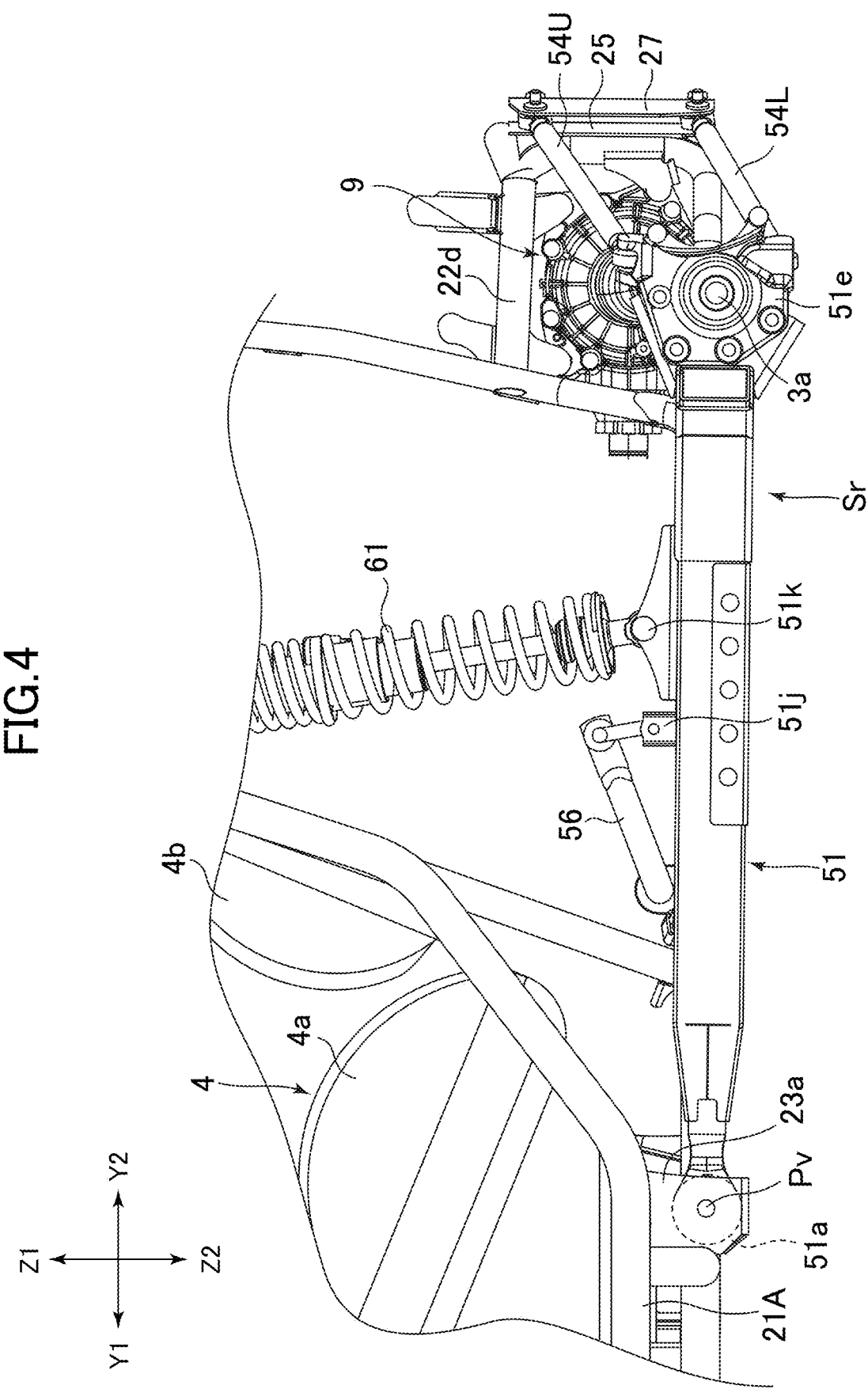
FIG. 4 is a side view of the rear suspension.

As shown in FIGS. 4 and 5, the rear suspension Sr has a plurality of lateral arms 54U and 54L extending outward in the direction of vehicle width from the frame rear section 20R. The ends of the lateral arms 54U and 54L are coupled to the trailing arm 51. In the examined vehicle 100, the rear suspension Sr has two lateral arms 54U and 54L spaced apart from each other in the up-down direction and arranged parallel to each other (hereinafter, the lateral arm 54U arranged on the upper side is referred to as an "upper arm" and the lateral arm 54L arranged on the lower side is referred to as a "lower arm"). The two lateral arms 54U and 54L overlap each other in a plan view. Apart from the structure in the examined vehicle 100, the positions of the two lateral arms 54U and 54L may be shifted from each other in the front-rear direction.

As shown in FIG. 7, an end 54a of each of the lateral arms 54U and 54L is coupled to a coupling part 51h of the knuckle part 51e via a support shaft 55. The coupling part 51h supports the support shaft 55, and the end 54a of each of the lateral arms 54U and 54L is coupled to the support shaft 55 (that is, the support shaft 55 is inserted in the end 54a). The end 54a of the arms 54U and 54L is rotatable about the support shaft 55. In the examined vehicle 100, the coupling part 51h is formed in an uppermost part and a lowermost part of the knuckle part 51e. The upper arm 54U is coupled to the coupling part 51h located in the upper most part. The lower arm 54L is coupled to the coupling part 51h located in the lowermost part. The two coupling parts 51h are located farther rearward than the axle 3a in a plan view.

The coupling structure between the lateral arms 54U and 54L and the trailing arm 51 is not limited to the structure in the examined vehicle 100. For example, the height and position of the coupling part 51h may be changed according to need. The end 54a of the lateral arms 54U and 54L may be coupled to the knuckle part 51e via a ball joint.

As shown in FIG. 5, the other end 54b of the arms 54U and 54L is coupled to a rearmost part of the frame rear section 20R. In the examined vehicle 100, the end 54b is coupled to the rearmost part of the frame rear section 20R via a ball joint 26 (see FIG. 7). The coupling structure between the frame rear section 20R and the arms 54U and 54L will be described in detail later.

[Angle Between Trailing Arm and Lateral Arm]

In FIG. 5, a point P1 represents the coupling point between the frame rear section 20R and the trailing arm 51, that is, the coupling point between the frame rear section 20R and the supported part 51a of the trailing arm 51. (This coupling point is referred to as a "first coupling point". A point P2 represents the coupling point between the trailing arm 51 and the arms 54U and 54L. (This coupling point is referred to as a "second coupling point".) A point P3 represents the coupling point between the arms 54U and 54L and the frame rear section 20R. (This coupling point is referred to as a "third coupling point".) A straight line L1 is the straight line connecting the first coupling point P1 and the second coupling point P2. A straight line L2 is the straight line connecting the second coupling point P2 and the third coupling point P3. A straight line L3 is the straight line connecting the first coupling point P1 and the third coupling point P3.

In the examined vehicle 100, the supported part 51a of the trailing arm 51 is coupled to the frame rear section 20R (more specifically, the cross member 23) via the support shaft Pv extending in the left-right direction. The first coupling point P1 is the center of the support shaft Pv in the left-right direction. If the trailing arm 51 is connected to the frame rear section 20R via a ball joint, the first coupling point P1 is the center of a ball of the ball joint. As described above, the end of the arms 54U and 54L is coupled to the knuckle part 51e via the support shaft 55. The second coupling point P2 is specifically the center of the support shaft 55 in the front-rear direction (direction of insertion of the support shaft 55). The third coupling point P3 is the center of a ball 26a (see FIG. 7) of the ball joint 26 coupling the frame rear section 20R and the arms 54U and 54L.

As shown in FIG. 5, an angle θ1 is formed between the straight line L1 connecting the first coupling point P1 and the second coupling point P2, and the straight line L2 connecting the second coupling point P2 and the third coupling point P3. (In this specification, the angle θ1 is defined when the rear suspension Sr or the like is viewed in a plan view and that is formed on the front side of the straight line L2.) In the exampled vehicle 100, the angle θ1 is 90 degrees or greater. More preferably, the angle θ1 is greater than 90 degrees. Even more preferably, the angle θ1 is greater than 93 degrees. It is also preferable that the angle θ1 is 120 degrees or smaller. It is more preferable that the angle θ1 is 110 degrees or smaller.

This structure of the rear suspension Sr reduces the change of the rear wheel 3 toward a toe-out direction, for example, at the time of braking on the rear wheel 3. FIGS. 10A and 10B explain such an advantage of the rear suspension Sr. FIG. 10A shows the related-art structure. FIG. 10B shows the structure of the rear suspension Sr of the vehicle 100. Components, members or parts in FIG. 10A corresponding to those of the rear suspension Sr in this embodiment is denoted by the same reference sign. In FIG. 10A, the angle θ1 between the straight line L1 and the straight line L2 is smaller than 90 degrees.

At the time of applying a braking force on the rear wheel 3, a friction between the rear wheel 3 and the ground acts as a force F1 pushing the rear wheel 3 rearward. Therefore, the force acts on the trailing arm 51, causing the trailing arm 51 to expand only slightly. (In FIG. 10A, the expanded trailing arm 51 is indicated by a dashed line.) The expansion of the trailing arm 51 causes the lateral arms 54U and 54L to tilt rearward. (In FIG. 10A, the lateral arms 54U and 54L tilting rearward are indicated by a dashed line.) As shown in FIG. 10A, if the angle θ1 between the first straight line L1 and the second straight line L2 is smaller than 90 degrees, the trailing arm 51 becomes closer to the center in the left-right direction of the vehicle body than the initial position when the lateral arms 54U and 54L are tilted rearward. That is, in FIG. 10A, the trailing arm 51 indicated by the dashed line is closer to the center than the trailing arm 51 indicated by a solid line. As described above, the rear wheel 3 is attached to the trailing arm 51 such that the angle between the rear wheel 3 and the trailing arm 51 does not change. Therefore, when the trailing arm 51 is tilted as shown in FIG. 10A, the toe angle of the rear wheel 3 changes in a toe-out direction.

Meanwhile, the structure of the rear suspension Sr where the angle θ1 between the straight line L1 and the straight line L2 is 90 degrees or greater allows the toe angle of the rear wheel 3 to change in a toe-in direction at the time a braking force on the rear wheel 3 is applied. That is, as shown in FIG. 10B, when the trailing arm 51 expands and the lateral arms 54U and 54L are tilted rearward due to the braking force applied on the rear wheel 3, the trailing arm 51 in FIG. 10B tilts outward in the direction of vehicle width from the initial position (that is, the left trailing arm 51 tilts to the left and the right trailing arm 51 tilts to the right), as opposed to the trailing arm 51 in FIG. 10A. Therefore, the rear wheel 3 is displaced in a toe-in direction. The restraining of the change in the toe angle of the rear wheel 3 in a toe-out direction is not limited to the time of applying a braking force on the rear wheel 3. The force pushing the rear wheel 3 rearward (pulling rearward) also acts, for example, when the rear wheel 3 goes over an uneven road surface or the like. In such a case, the related-art structure tends to result in the change in the toe angle of the rear wheel 3 in a toe-out direction, whereas the structure of the rear suspension Sr of the vehicle 100 can reduce such change in a toe-out direction.

As described above, a bush (for example, a rubber bush) is disposed between the supported part 51a and the support shaft Pv. A load (stress) between the supported part 51a and the support shaft Pv due to the tilt of the trailing arm 51 as shown in FIG. 10B is restrained by elastic deformation of the bush. The front end of the trailing arm 51 may be connected to the frame rear section 20R via a ball joint instead of the support shaft Pv. In this case, when the trailing arm 51 tilts outward in the direction of vehicle width as shown in FIG. 10B due to a braking force applied to the rear wheel 3, the ball joint allows free tilting of the front end (supported part 51a) of the trailing arm 51.

[Arrangement of Lateral Arm]

As shown in FIG. 5, the coupling part between the lateral arms 54U and 54L and the knuckle part 51e (that is, the second coupling point P2) is located farther outward in the direction of vehicle width than the coupling part between the trailing arm 51 and the frame middle section 20M (that is, the first coupling point P1). Therefore, the first straight line L1 is tilted from a straight line C1 along the front-rear direction. Meanwhile, the coupling part between the arms 54U and 54L and the frame rear section 20R (the third coupling point P3) is located farther rearward than the rear end of the trailing arm 51, and the lateral arms 54U and 54L (in other words, the second straight line L2) extend obliquely rearward from the coupling part between the trailing arm 51 and the lateral arms 54U and 54L (that is, the second coupling point P2) toward the third coupling point P3. This tilt of the lateral arms 54U and 54L (in other words, the second straight line L2) secures the angle θ1 of 90 degrees or greater between the first straight line L1 and the second straight line L2 and causes the left and right lateral arms 54U and 54L to be arranged in a V-shaped opening facing a forward direction.

[Position of Third Coupling Point]

To achieve the angle θ1 of 90 degrees or greater between the first straight line L1 and the second straight line L2, it is desirable that the position of the third coupling point P3 is close to the rear end of the vehicle body. In the exampled vehicle 100, the gear box 9 is located to the rear of the engine 7. As shown in FIG. 5, the third coupling point P3 is located farther rearward than the gear box 9. More specifically, the third coupling point P3 is located farther rearward than a rear end 9b of the gear box 9. This structure makes it easier to achieve the angle θ1 of 90 degrees or greater, for example, than with the structure where the third coupling point P3 is located farther forward than the rear end 9b of the gear box 9.

The frame rear section 20R has a part located farther rearward than the gear box 9. The third coupling point P3 is connected to this part of the frame rear section 20R. That is, the ball joint 26 is connected to the part located farther rearward than the gear box 9. In the exampled vehicle 100, the third coupling point P3 (ball joint 26) is located to the rear of a member 25 (see FIG. 9) forming the rearmost part of the frame rear section 20R and is fixed to the member 25.

Specifically, the frame rear section 20R has, at its rear part, left and right lower extension parts 22c (see FIG. 8) extending in the front-rear direction, and left and right vertical parts 22e (see FIG. 9) extending upward from the rear end of the left and right lower extension parts 22c. The lower extension part 22c is a part extending farther rearward from the rear part of the middle extension part 21B. A support part 25 is fixed to the rear side of the left and right vertical parts 22e to couple the left and right vertical parts 22e. The support part 25 is located to the rear of the gear box 9 and overlaps the gear box 9 in a back view. The third coupling point P3 (ball joint 26) is attached to this support part 25. In the exampled vehicle 100, the third coupling point P3 is located to the rear of the support part 25. The gear box 9 is supported on the upper side of the left and right lower extension parts 22c. The frame rear section 20R has an upper extension part 22d extending forward from an upper part of the vertical part 22e. The upper extension part 22d is spaced apart upward from lower extension part 22c and located above the gear box 9 in a side view.

Since the third coupling point P3 (ball joint 26) is thus located further rearward from the support part 25 located at the rearmost part of the frame rear section 20R, the third coupling point P3 is located at the rear end of the frame rear section 20R. Therefore, it is easier to secure the angle θ1 of 90 degrees or greater. Also, the left and right third coupling points P3 (ball joints 26) are close to the center C1 in the left-right direction of the vehicle body and overlap the gear box 9 in a back view of the vehicle body. Thus, a sufficient length of the lateral arms 54U and 54L is secured and the swing angle of the lateral arms 54U and 54L when the rear wheel 3 moves up and down can be reduced. The position of the third coupling point P3 is not limited to the position in the exampled vehicle 100. For example, the third coupling point P3 may not have to be at a position overlapping the gear box 9 as viewed in a back view of the vehicle body.

[Ball Joint]

Figure 8:
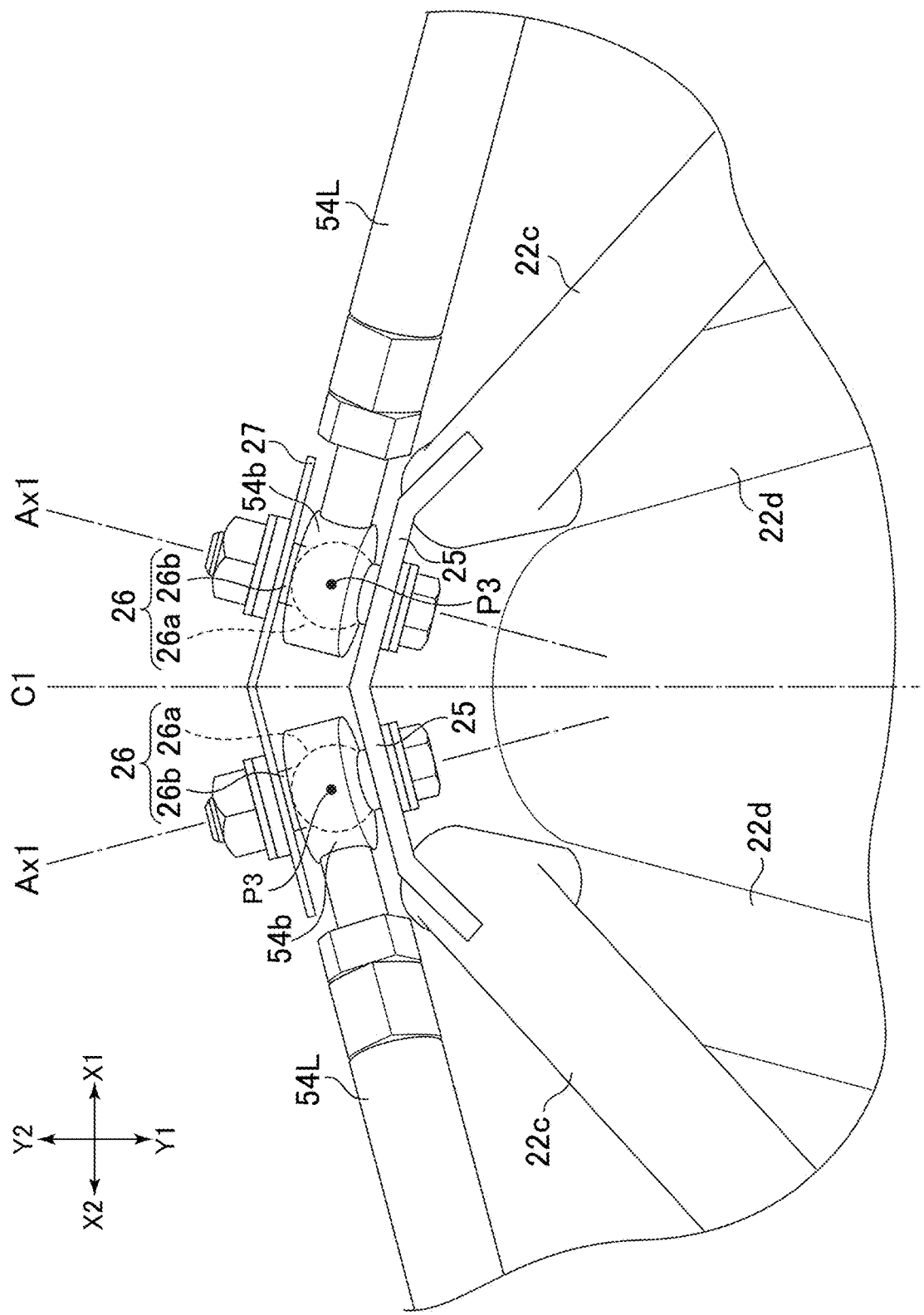
FIG. 8 is a bottom view showing a joint between a lateral arm and the vehicle frame, provided at the rear end of the vehicle frame.
Figure 9:
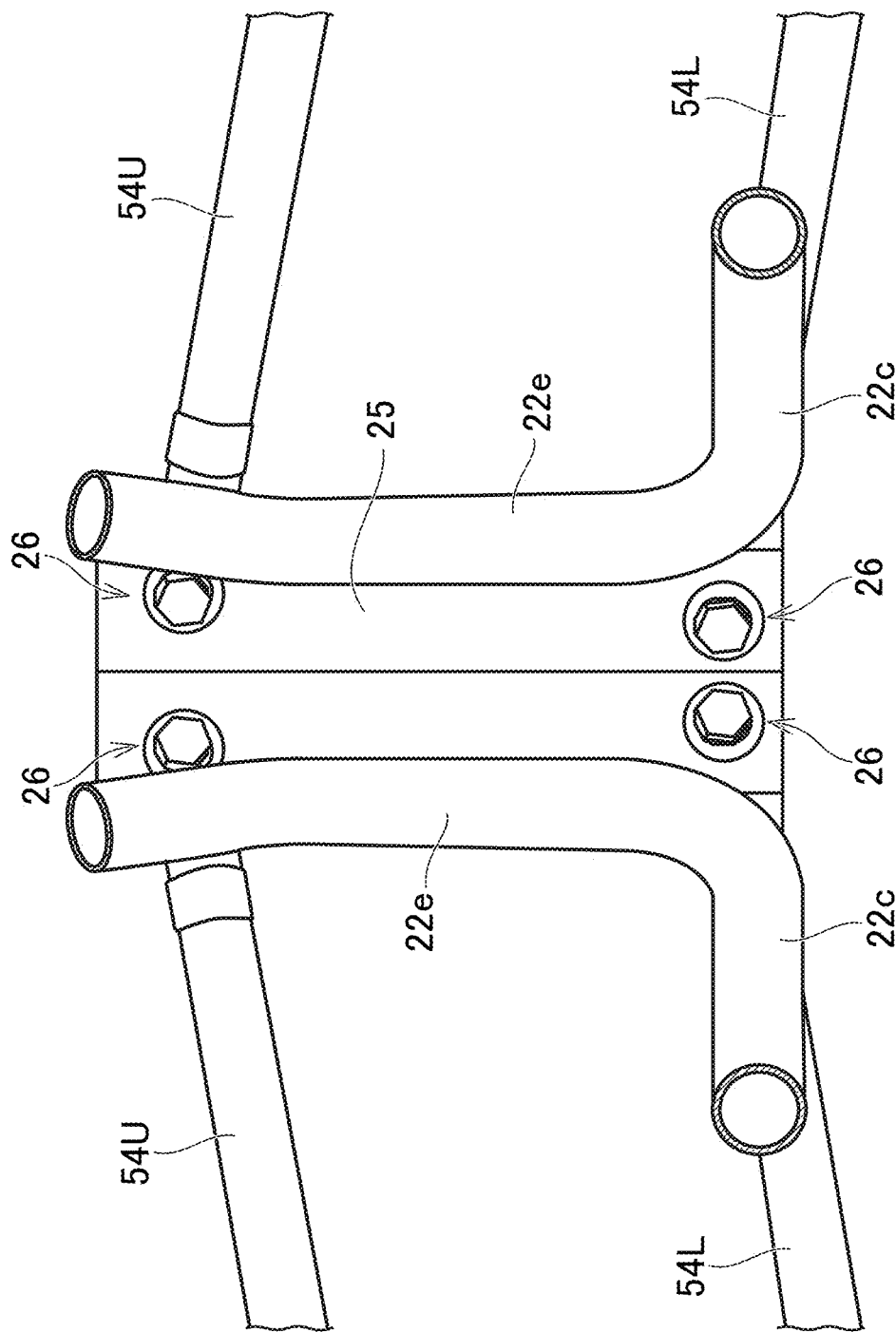
FIG. 9 shows the vehicle frame as viewed in a direction indicated by an arrow IX in FIG. 5.

As described above, the lateral arms 54U and 54L are coupled to the frame rear section 20R via the ball joint 26. As shown in FIG. 8, the ball joint 26 has a ball 26a and a rod 26b supporting the ball 26a. In the exampled vehicle 100, the support part 25 is like a plate. The rod 26b is fixed to the support part 25. The rod 26b is inserted in a hole formed in the support part 25. The ball 26a is located to the rear of the support part 25. A socket is located at the end 54b of the lateral arms 54U and 54L to be coupled to the ball 26a. Since the ball joint 26 is provided at each of the ends 54b of the left and right lateral arms 54U and 54L, four ball joints 26 are fixed to the support part 25. The rod 26b is, for example, a bolt, which is inserted through a hole formed in the ball 26a and thus supports the ball 26a. The structure of the ball joint 26 is not limited to the structure in the exampled vehicle 100, provided that the ball joint 26 can support the ball 26a and can be attached to the support part 25 and a coupling member 27, described later. For example, the rod 26b may not be a bolt inserted through the hole formed in the ball 26a.

In the structure where the lateral arms 54U and 54L are thus coupled to the frame rear section 20R via the ball joint 26, it is easier to locate the third coupling point P3 at the rearmost part of the vehicle, than in the structure where the lateral arms 54U and 54L are coupled to the frame rear section 20R via a shaft supported at both ends by the frame rear section 20R.

The lateral arms 54U and 54L extend outward in the direction of vehicle width and obliquely forward from the ball joint 26. Therefore, as shown in FIG. 8, the rod 26b of the ball joint 26 is fixed obliquely to the straight line C1 along the front-rear direction. That is, the rod 26b is arranged obliquely such that its axial line Ax1 approaches the center C1 in the direction of vehicle width as it goes forward. The support part 25 bends at the center C1 to be in a V-shaped opening facing a forward direction. The rod 26b is attached perpendicularly to the support part 25. The V-shape of the support part 25 provides the attitude (tilt) of the rod 26b.

The support structure of the rod 26b is not limited to the structure in the exampled vehicle 100. For example, the support part 25 may not have to be like a plate. For example, the left and right vertical parts 22e (see FIG. 8) located at the rearmost part of the frame rear section 20R may be coupled by two rod-like support parts 25 spaced apart from each other in the up-down direction. The ball joint 26 may be fixed to each of these two support parts 25.

[Reinforcement of Ball Joint]

As shown in FIG. 8, the vehicle 100 has a plate-like coupling member 27 coupling the rear end of the rod 26b. The coupling member 27 is arranged on the other side of the end 54b of the lateral arms 54U and 54L from the support part 25. The four rods 26b are fixed to the coupling member 27. That is, the four rods 26b are coupled to each other by the coupling member 27. In this structure, a load acting on one ball joint 26 via the lateral arms 54U and 54L can be received by the other three ball joints 26. This can increase the strength of support of the ball joint 26 (strength of support of the rod 26b). The coupling member 27 is not connected to the frame rear section 20R. That is, the coupling member 27 is not an element of the frame rear section 20R. Therefore, the coupling member 27 can be removed from the rod 26b. This can facilitate maintenance work on the vehicle.

The structure to increase the strength of support of the ball joint 26 is not limited to the structure in the exampled vehicle 100. For example, not all of the four ball joints 26 may be coupled to each other. That is, the vehicle 100 may have a coupling member which couples upper two ball joints 26 (that is, the two ball joints 26 to which the left and right lateral arms 54U on the upper side are coupled), and a coupling member which couples the lower two ball joints 26 (that is, the two ball joints 26 to which the left and right lateral arms 54L on the lower side are coupled). In still another example, the vehicle 100 may have a coupling member which couples the right two ball joints 26 (that is, the two ball joints 26 to which the lateral arms 54U and 54L on the right side are coupled), and a coupling member which couples the left two ball joints 26 (that is, the two ball joints 26 to which the lateral arms 54U and 54L on the left-hand side are coupled). As still another example, the vehicle 100 may have four coupling parts. The four coupling parts may fix the rods 26b of the four ball joints 26 respectively to a part (for example, the frame rear section 20R) that is different from the ball joints 26.

[Toe-Control Link and Bush]

As described above, the trailing arm 51 has, at its front end, the supported part 51a coupled to the arm support part 23a of the cross member 23 of the frame middle section 20M via the support shaft Pv. The supported part 51a is coupled to the arm support part 23a via a bush. The supported part 51a is cylindrical, with the support shaft Pv inserted therein. The bush is arranged between the support shaft Pv and the inner surface of the supported part 51a. The bush enables the supported part 51a to be displaced in the axial direction of the support shaft Pv (that is, in the left-right direction) to and from the arm support part 23a. The supported part 51a may be displaceable in the radial direction of the support shaft Pv (that is, in the front-rear direction and the up-down direction) to and from the arm support part 23a. As the bush, for example, a rubber bush, a ball bush or the like can be used.

As shown in FIG. 5, the rear suspension Sr has a toe-control link 57. The toe-control link 57 is located farther rearward than the front end (supported part 51a) of the trailing arm 51 and farther forward than the lateral arms 54U and 54L. The toe-control link 57 couples the body frame 20 and the trailing arm 51. Therefore, the toe-control link 57 is shorter than the lateral arms 54U and 54L.

Figure 12A:
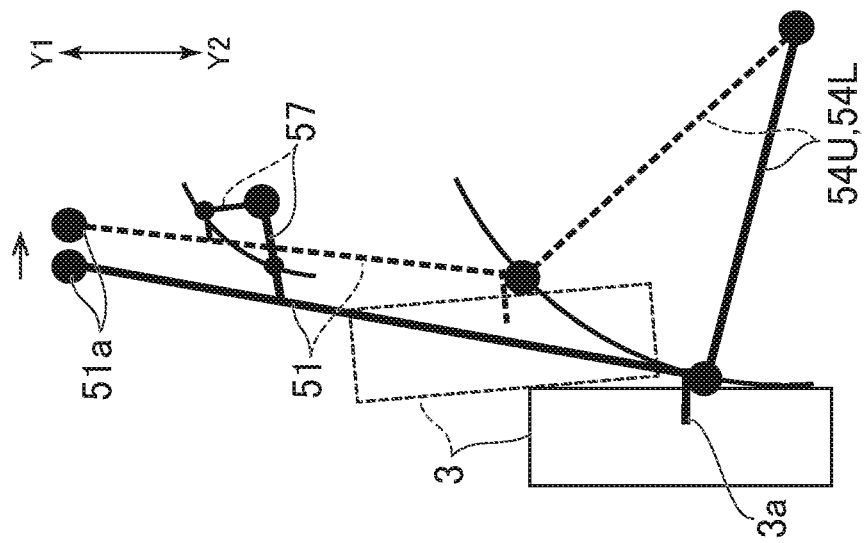
FIGS. 12A and 12B are plan views showing the behavior of the rear suspension when the rear wheel goes over a bump on the ground.
Figure 12B:
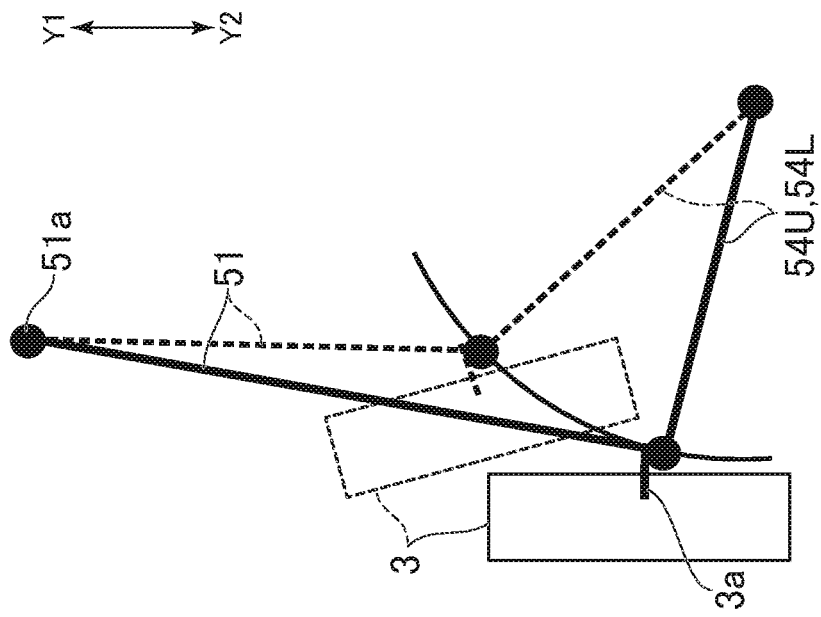

Using such a toe-control link 57 can reduce the displacement of the rear wheel 3 in a toe-out direction when the rear wheel 3 goes over a bump on the ground. FIGS. 11A and 11B and FIGS. 12A and 12B explain advantages of the toe-control link 57 and show the movement of the trailing arm 51 and the movement of the rear wheel 3 when the rear wheel 3 goes over a bump. FIG. 11A is a schematic side view showing the movement of the trailing arm 51. FIG. 11B is a schematic back view showing the movement of the trailing arm 51. FIG. 12A is a plan view showing the movement of the trailing arm 51 in the state where the toe-control link 57 is not provided. FIG. 12B is a plan view showing the movement of the trailing arm 51 in the state where the toe-control link 57 is attached.

As shown in FIGS. 11A and 11B, when the rear wheel 3 goes over a bump, the trailing arm 51 moves upward about the support shaft Pv located at its front end. At this time, since the lateral arms 54U and 54L are coupled to the trailing arm 51, when the trailing arm 51 moves upward as shown in FIGS. 11A and 11B, the attitude of the trailing arm 51 in a plan view becomes closer to a straight line along the front-rear direction as shown in FIG. 12A. That is, the tilt angle of the trailing arm 51 with respect to the front-rear direction is reduced. Since the relative position between the rear wheel 3 and the trailing arm 51 is fixed as described above, when the tilt angle of the trailing arm 51 with respect to the front-rear direction (Y1-Y2 direction) is reduced, the axle 3a of the rear wheel 3 tilts outward in the direction of vehicle width and in a rearward direction. Therefore, the rear wheel 3 is displaced in a toe-out direction.

Meanwhile, in the structure where the trailing arm 51 is coupled to the frame rear section 20R via the toe-control link 57, when the trailing arm 51 moves upward, the toe-control link 57 draws the trailing arm 51 toward the center C1 in the direction of vehicle width as shown in FIG. 12B. As described above, in the vehicle 100, the supported part 51a of the trailing arm 51 is displaceable in the axial direction of the support shaft Pv due to the action of the bush. Therefore, when the toe-control link 57 draws the trailing arm 51 toward the center C1 in the direction of vehicle width, the supported part 51a is displaced toward the center C1 in the direction of vehicle width. Thus, the tilt angle of the trailing arm 51 is maintained (that is, change in the angle of the trailing arm 51 with respect to the front-rear direction is reduced), compared with the structure shown in FIG. 12A, where the toe-control link 57 is not provided. Thus, the displacement of the rear wheel 3 in a toe-out direction is reduced. As described above, the front end of the trailing arm 51 may be connected to the frame middle section 20M via a ball joint. In this case, the rear suspension Sr may not have to have the toe-control link 57.

As shown in FIG. 3, the front end (supported part 51a) of the trailing arm 51 is located farther forward than the engine 7. Also, the front end of the trailing arm 51 is located below the seat 4. In the examined vehicle 100, the front end of the trailing arm 51 is located below the seat bottom 4a (a part having an upper surface where a passenger sits). This layout of the front end of the trailing arm 51 secures a sufficient length of the trailing arm 51. Therefore, the tilt of the first straight line L1 with respect to the front-rear direction of the vehicle 100 and the tilt of the third straight light L3 with respect to the front-rear direction are gentle. Thus, as shown in FIG. 5, in the examined vehicle 100, the first straight line L1 intersects a tire 12 attached to the rear wheel 3, and the third straight line L3 intersects the gear box 9. Securing a sufficient length of the trailing arm 51 in this manner reduces the swing in the up-down direction of the trailing arm 51 and reduces the change in the toe angle of the rear wheel 3.

[Position of Toe-Control Link]

As shown in FIG. 5, the toe-control link 57 extends forward and obliquely toward the center C1 in the direction of vehicle width from a coupling point P4 between the toe-control link 57 and the trailing arm 51. With the toe-control link 57 arranged in this way, the angle formed by the third straight line L3 and the direction of extension of the toe-control link 57 (angle formed on the front side of the toe-control link 57) is 90 degrees or greater. Therefore, for example, the displacement of the trailing arm 51 when a lateral force acts on the rear wheel 3 in a circular movement of the vehicle 100 is reduced and the change in the toe angle of the rear wheel 3 can be reduced.

In the examined vehicle 100, the toe-control link 57 is arranged substantially at right angles to the straight line L3. Thus, the change in the toe angle of the rear wheel 3 when a lateral force acts on the rear wheel 3 can be restrained more effectively. The arrangement of the toe-control link 57 is not limited to the arrangement in the examined vehicle 100. For example, the toe-control link 57 may be arranged parallel to the direction of vehicle width or may extend rearward and toward the center C1 in the direction of vehicle width from the coupling point P4.

As shown in FIG. 5, the distance between the coupling point P4 between the toe-control link 57 and the trailing arm 51 and a coupling point P5 between the toe-control link 57 and the frame rear section 20R is smaller than the distance between the straight line L1 and the straight line L3. (The distance between the straight line L1 and the straight line L3 is the distance between a first point and a second point, where the first point is an intersection between the straight line L1 and a straight line orthogonal to the straight line L3 and passing through the toe-control link 57, and the second point is an intersection between the straight line L3 and the same straight line orthogonal to the straight line L3.) Thus, when the trailing arm 51 moves upward, the toe-control link 57 draws the trailing arm 51 toward the center C1 in the direction of vehicle width. In the examined vehicle 100, the coupling point P4 between the toe-control link 57 and the trailing arm 51 is located more inward than the straight line L1 (located more closely to the center C1 in the direction of vehicle width). The coupling point P5 between the toe-control link 57 and the frame rear section 20R is located more inward than the straight line L3 (located more closely to the center C1 in the direction of vehicle width).

As shown in FIG. 5, in the examined vehicle 100, a bracket 51i extending toward the center C1 in the direction of vehicle width is attached to the trailing arm 51. An end of the toe-control link 57 is coupled to the bracket 51i. Therefore, the coupling point P4 between the trailing arm 51 and the toe-control link 57 is located more closely to the center C1 in the direction of vehicle width than the trailing arm 51. Also, a bracket 20f extending outward in the direction of vehicle width is attached to the frame rear section 20R (the rear part of the middle extension part 21B). The other end of the toe-control link 57 is coupled to the bracket 20f. As described here, the toe-control link 57 is connected to the frame rear section 20R and the trailing arm 51 respectively via the brackets 20f and 51i. The length of the toe-control link 57 may be smaller than the distance between the straight line L3 and the straight line L1 (the distance in a direction parallel to the toe-control link 57).

The ends of the toe-control link 57 are connected to the trailing arm 51 and the frame rear section 20R via a ball joint. One end of the toe-control link 57 is coupled to a ball joint supported by the bracket 51i, and the other end of the toe-control link 57 is coupled to a ball joint supported by the bracket 20f. This configuration secures a degree of freedom of the angle of the toe-control link 57. Thus, an unwanted force (load) can be restrained from acting on the coupling between the toe-control link 57 and the frame rear section 20R and the coupling between the toe-control link 57 and the trailing arm 51, for example, when the trailing arm 51 moves slightly rearward due to the braking applied to the rear wheel 3.

As shown in FIG. 3, the left and right trailing arms 51 are coupled to each other via a stabilizer 56. A center part of the stabilizer 56 is fixed to the frame rear section 20R. Ends of the stabilizer 56 are coupled respectively to the left and right trailing arms 51. When the vehicle 100 is running, the stabilizer 56 restrains large up-down displacement of the trailing arm 51 on one side only.

As shown in FIG. 5, a coupling part 51j to which the end of the stabilizer 56 is coupled is formed in the trailing arm 51. The coupling part between the toe-control link 57 and the trailing arm 51 (in the exampled vehicle 100, the bracket 51i and the ball joint) is located farther forward than the coupling part 51j. This brings the position of the toe-control link 57 closer to the front end of the trailing arm 51 and therefore makes it easy to reduce the length of the toe-control link 57. Thus, the drawing effect of the toe-control link 57 on the trailing arm 51 when the rear wheel 3 goes over a bump on the ground can be enhanced.

In the exampled vehicle 100, the entirety of the toe-control link 57 is located farther forward than the stabilizer 56. Also, in the exampled vehicle 100, the coupling part 51j is located substantially at a center part of the trailing arm 51 in the front-rear direction, and the toe-control link 57 is located farther forward than the center part of the trailing arm 51.

Similarly to the front end (supported part 51a) of the trailing arm 51, the toe-control link 57 is located below the seat 4 in a plan view (see FIG. 3). Specifically, the toe-control link 57 is located below a seat back 4b. However, the position of the toe-control link 57 is not limited to the example described here. For example, the toe-control link 57 may be located farther rearward than the stabilizer 56.

Figure 6:
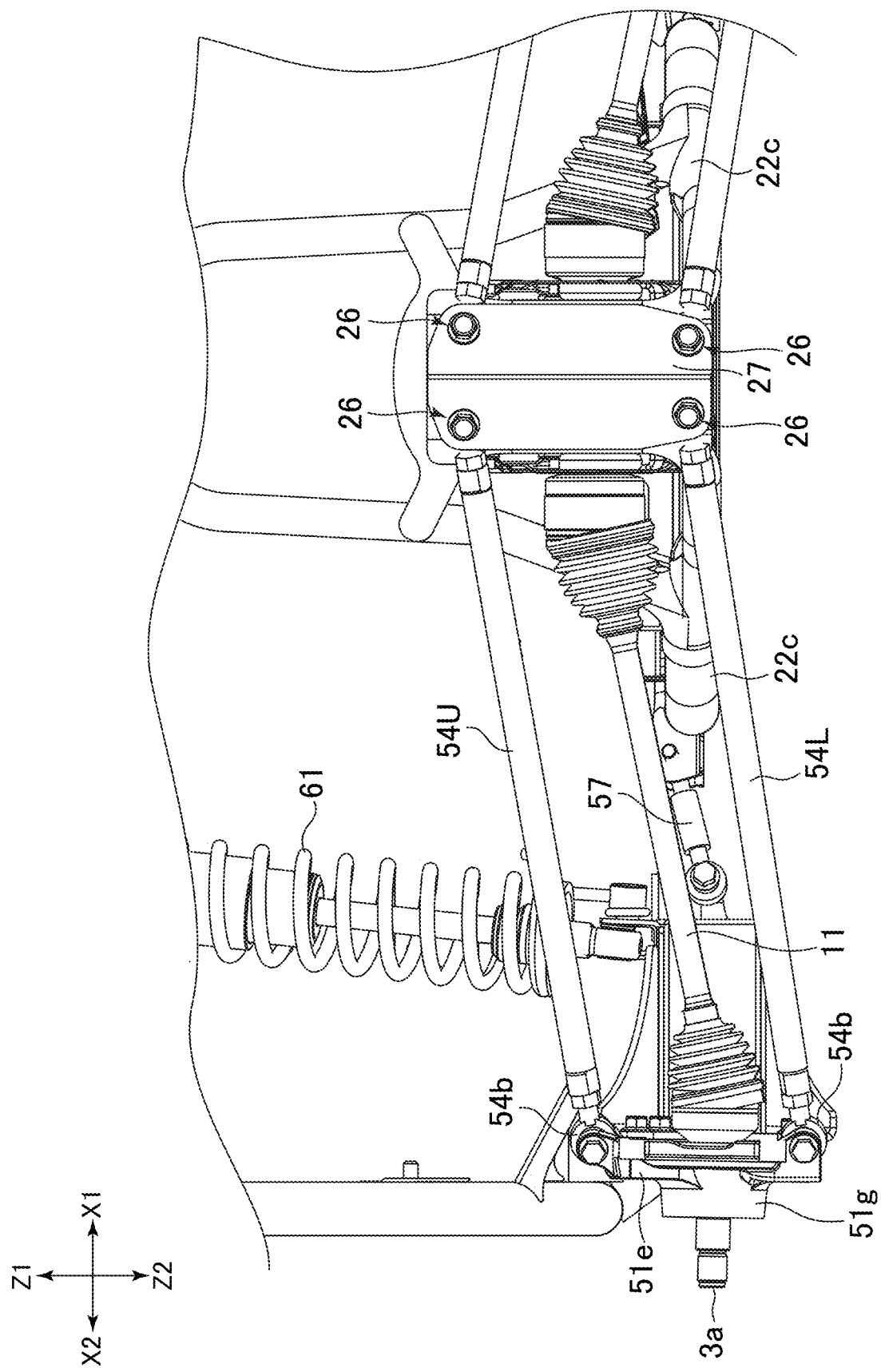
FIG. 6 is a back view of the rear suspension.

As shown in FIGS. 4 and 6, the rear suspension Sr has a shock absorber 61. The lower end of the shock absorber 61 is coupled to the trailing arm 51. The upper end of the shock absorber 61 is coupled to the body frame 20 (more specifically, the frame middle section 20M). A coupling part 51k to which the lower end of the shock absorber 61 is coupled is provided in the trailing arm 51. As shown in FIG. 5, the coupling part between the toe-control link 57 and the trailing arm 51 (in the exampled vehicle 100, the bracket 51i and the ball joint) is located farther forward than the coupling part 51k. This brings the position of the toe-control link 57 closer to the front end of the trailing arm 51 and therefore makes it easy to reduce the length of the toe-control link 57. Thus, the drawing effect of the toe-control link 57 on the trailing arm 51 when the rear wheel 3 goes over a bump on the ground can be enhanced.

In the exampled vehicle 100, the coupling part 51j to which the stabilizer 56 is coupled is located farther forward than the coupling part 51k to which the shock absorber 61 is coupled. The coupling part between the toe-control link 57 and the trailing arm 51 is located farther forward than the coupling part 51j.

As shown in FIG. 5, the coupling part between the toe-control link 57 and the trailing arm 51 (in the exampled vehicle 100, the bracket 51i and the ball joint) is located inside the triangle defined by the three straight lines (that is, the first straight line L1, the second straight line L2, the third straight line L3). Also, the coupling part 51j between the stabilizer 56 and the trailing arm 51 is located inside this triangle. Moreover, the coupling part 51k between the trailing arm 51 and the shock absorber 61 is located inside this triangle. This reduces the distance between the toe-control link 57, the stabilizer 56, and the shock absorber 61, making it easy to secure a space for other components.

[Summary]

(1) In the vehicle 100, the coupling point between the vehicle frame Fv and the trailing arm 51 is defined as the first coupling point P1. The coupling point between the trailing arm 51 and the lateral arms 54U and 54L is defined as the second coupling point P2. The coupling point between the lateral arms 54U and 54L and the frame rear section 20R is defined as the third coupling point P3. The straight line connecting the first coupling point P1 and the second coupling point P2 is defined as the first straight line L1. The straight line connecting the second coupling point P2 and the third coupling point P3 is defined as the second straight line L2. The angle between the first straight line L1 and the second straight line L2 in a plan view of the vehicle is 90 degrees or greater. This vehicle 100 can reduce change in the toe angle of the rear wheel 3 in a toe-out direction at the time of a braking force is applied by the vehicle.

(2) The third coupling point P3 is located farther rearward than the gear box 9 accommodating the final reduction gear mechanism which transmits the power of the engine 7 to the rear wheel 3. Owing to this configuration, the third coupling point P3 is near the rearmost part of the vehicle body or located in the rearmost part. Therefore, an angle of 90 degrees or greater can be easily secured between the first straight line L1 and the second straight line L2.

(3) The frame rear section 20R has the part (support part 25) located farther rearward than the gear box 9 and not overlapping the gear box 9 in a plan view. The lateral arms 54U and 54L are coupled to the support part 25 of the frame rear section 20R. In this configuration, the third coupling point P3 is near the rearmost part of the vehicle body or located in the rearmost part. Therefore, an angle of 90 degrees or greater can be easily secured between the first straight line L1 and the second straight line L2.

(4) The vehicle frame Fv includes the frame rear section 20R located between the left and right rear wheels 3. The third coupling point P3 is at the rear end of the frame rear section 20R. Owing to this configuration, an angle of 90 degrees or greater can be easily secured between the first straight line L1 and the second straight line L2.

(5) The lateral arms 54U and 54L are coupled to the frame rear section 20R via the ball joint 26 at the third coupling point P3. In this configuration, a sufficient length of the lateral arms 54U and 54L can be easily secured. Thus, when the rear wheel 3 goes over a bump on the ground, the swing angle of the lateral arms 54U and 54L is reduced and therefore change in the toe angle of the rear wheel 3 in a toe-out direction can be reduced.

(6) The ball joint 26 includes the rod 26b. One end of the rod 26b is supported by the frame rear section 20R. The coupling member 27 is attached to the other end of the rod 26b to connect the rod 26b to another part. This configuration can enhance the support structure of the rod 26b.

(7) The two trailing arms 51 are located opposite to each other in the left-right direction. The two trailing arms 51 are coupled by the stabilizer 56. Each of the two trailing arms 51 is coupled to the vehicle frame Fv via the shock absorber 61. The trailing arms 51 are coupled to the frame rear section 20R via the toe-control links 57. The straight line connecting the first coupling point P1 and the third coupling point P3 is defined as the third straight line L3. The coupling part between the toe-control link 57 and the trailing arm 51 (the bracket 51i and the ball joint), the coupling part 51j between the stabilizer 56 and the trailing arm 51, and the coupling part 51k between the trailing arm 51 and the shock absorber 61 are located inside the triangle defined by the first straight line L1, the second straight line L2, and the third straight line L3. Owing to this configuration, the positions of the three coupling points are not widely dispersed. Therefore, a space to arrange other components is easily secured.

(8) The vehicle 100 includes the toe-control link 57 arranged between the supported part 51a and the lateral arms 54U and 54L and coupling the trailing arm 51 and the frame rear section 20R. This configuration can reduce change in the toe angle of the rear wheel 3 in a toe-out direction when the rear wheel 3 goes over a bump on the ground.

(9) The supported part 51a of the trailing arm 51 is displaceable in the direction of vehicle width with respect to the body frame 20. The control link 57 in this configuration enables the supported part 51a of the trailing arm 51 to be displaced toward the center C1 in the direction of vehicle width when the rear wheel 3 goes over a bump on the ground. Thus, change in the toe angle of the rear wheel 3 in a toe-out direction can be reduced more effectively.

(10) The toe-control link 57 extends rearward and outward in the direction of vehicle width from the coupling point between the toe-control link 57 and the frame rear section 20R. This configuration makes the angle formed between the straight line L3 and the direction of extension of the toe-control link 57 be close to 90 degrees. Therefore, displacement of the trailing arm 51 is reduced when a force in the lateral direction acts on the rear wheel 3. Thus, change in the toe angle of the rear wheel 3 can be reduced.

(11) The vehicle 100 includes the two trailing arms 51 located opposite to each other in the left-right direction. The two trailing arms 51 are coupled via the stabilizer 56. The coupling part between the toe-control link 57 and the trailing arm 51 is located farther forward than the coupling part between the stabilizer 56 and the trailing arm 51. This configuration makes the position of the toe-control link 57 close to the front end of the trailing arm 51 and reduces the length of the toe-control link 57. Thus, when the rear wheel 3 goes over a bump on the ground, change in the toe angle of the rear wheel 3 in a toe-out direction can be reduced more effectively.

(12) The coupling part between the toe-control link 57 and the trailing arm 51 is located farther forward than the coupling part between the trailing arm 51 and the shock absorber 61. This configuration makes the position of the toe-control link 57 close to the front end of the trailing arm 51 and reduces the length of the toe-control link 57. Thus, when the rear wheel 3 goes over a bump on the ground, change in the toe angle of the rear wheel 3 in a toe-out direction can be reduced more effectively.

(13) The first straight line L1 intersects the tire 12 of the rear wheel 3, as viewed in a plan view of the vehicle 100. The front end (supported part 51a) of the trailing arm 51 in this configuration is located farther forward than, for example, in the configuration where the first straight line L1 does not intersect the tire 12 of the rear wheel 3. This can increase the length of the trailing arm 51, reduce the swing angle of the trailing arm 51, and therefore can reduce change in the toe angle of the rear wheel 3 in a toe-out direction more effectively.

(14) The third straight line L3 may intersect the gear box 9, in a plan view of the vehicle. The front end (supported part 51a) of the trailing arm 51 in this configuration is located farther forward than, for example, in the configuration where the third straight line L3 does not intersect the gearbox 9. This increases the length of the trailing arm 51, reduces the swing angle of the trailing arm 51, and therefore can reduce change in the toe angle of the rear wheel 3 in a toe-out direction more effectively.

The vehicle proposed in this disclosure is not limited to the vehicle 100 and various changes may be made.

For example, the toe-control link 57 may be located farther rearward than the coupling part 51k of the shock absorber 61. As another example, the toe-control link 57 may be located between the coupling part 51j of the stabilizer 56 and the coupling part 51k of the shock absorber 61. As still another example, the vehicle 100 may not have to have the toe-control link 57.

What is claimed is:
1. A vehicle comprising:
a vehicle frame;
a trailing arm which has a supported part coupled to the vehicle frame and extends rearward from the supported part;
a rear wheel attached to the trailing arm; and
a lateral arm which couples the vehicle frame and the trailing arm at a position rearwardly away from the supported part,
wherein
the rear wheel is attached to the trailing arm such that an angle between the rear wheel and the trailing arm in a plan view of the vehicle is fixed,
when a coupling point between the vehicle frame and the supported part of the trailing arm is defined as a first coupling point, a coupling point between the trailing arm and the lateral arm is defined as a second coupling point, a coupling point between the lateral arm and the vehicle frame is defined as a third coupling point, a straight line connecting the first coupling point and the second coupling point is defined as a first straight line, and a straight line connecting the second coupling point and the third coupling point is defined as a second straight line, and
an angle between the first straight line and the second straight line in a plan view of the vehicle is 90 degrees or greater.

2. The vehicle according to claim 1, wherein
the third coupling point is located farther rearward than a gear box accommodating a final reduction gear mechanism which transmits power of an engine to the rear wheel.

3. The vehicle according to claim 2, wherein
the vehicle frame has a part which is located farther rearward than the gear box and which does not overlap the gear box in a plan view, and
the lateral arm is coupled to the part of the vehicle frame.

4. The vehicle according to claim 2, wherein
the supported part of the trailing arm is displaceable in a direction of vehicle width with respect to the vehicle frame.

5. The vehicle according to claim 4, further comprising:
a first trailing arm and a second trailing arm, each used as the trailing arm and located opposite to each other in a left-right direction,
wherein the first trailing arm and the second trailing arm are coupled via a stabilizer, and
a coupling part between a toe-control link and the trailing arm is located farther forward than a coupling part between the stabilizer and the trailing arm.

6. The vehicle according to claim 2, further comprising:
a shock absorber coupled between the vehicle frame and the trailing arm, wherein a coupling part between a toe-control link and the trailing arm is located farther forward than a coupling part between the trailing arm and the shock absorber.

7. The vehicle according to claim 1, wherein
the vehicle frame includes a frame rear section located between left and right rear wheels, and
the third coupling point is located at a rear end of the frame rear section.

8. The vehicle according to claim 1, wherein
the lateral arm is coupled to the vehicle frame via a ball joint at the third coupling point.

9. The vehicle according to claim 8, wherein
the ball joint has a rod,
one end of the rod is supported by the vehicle frame, and
a coupling member is attached to the other end of the rod to connect the rod to another part.

10. The vehicle according to claim 1, wherein
a first trailing arm and a second trailing arm are each used as the trailing arm and located opposite to each other in a left-right direction,
the first trailing arm and the second trailing arm are coupled by a stabilizer,
each of the first trailing arm and the second trailing arm is coupled to the vehicle frame via a shock absorber,
the trailing arm is coupled to the vehicle frame via a toe-control link, and
when a straight line connecting the first coupling point and the third coupling point is defined as a third straight line,
a coupling part between the toe-control link and the trailing arm, a coupling part between the stabilizer and the trailing arm, and a coupling part between the trailing arm and the shock absorber are located inside a triangle defined by the first straight line, the second straight line, and the third straight line.

11. The vehicle according to claim 1, further comprising a toe-control link which is arranged between the supported part and the lateral arm and couples the trailing arm and the vehicle frame.

12. The vehicle according to claim 11, wherein
the toe-control link extends rearward and outward in a direction of vehicle width from a coupling point between the toe-control link and the vehicle frame.

13. The vehicle according to claim 1, wherein
the first straight line intersects a tire of the rear wheel in a plan view of the vehicle.

14. The vehicle according to claim 1, further comprising:
a gear box accommodating a final reduction gear mechanism which transmits power of an engine to the rear wheel,
wherein when a straight line connecting the first coupling point and the third coupling point is defined as a third straight line, the third straight line intersects the gear box in a plan view of the vehicle.

15. The vehicle according to claim 1, wherein
when there is a force pushing the rear wheel rearward, the trailing arm tilts outward in a direction of vehicle width from an initial position, and a toe angle of the rear wheel changes in a toe-in direction.

16. The vehicle according to claim 1, wherein
the angle between the first straight line and the second straight line in the plan view of the vehicle is greater than 90 degrees.

17. The vehicle according to claim 1, wherein
the first straight line is tilted from a center line in a left-right direction of the vehicle body, the center line extending along a front-rear direction of the vehicle.

* * * * *